(No Model.) 3 Sheets—Sheet 2.
E. A. SPERRY.
POWER GEARING FOR TRUCKS.
No. 567,418. Patented Sept. 8, 1896.
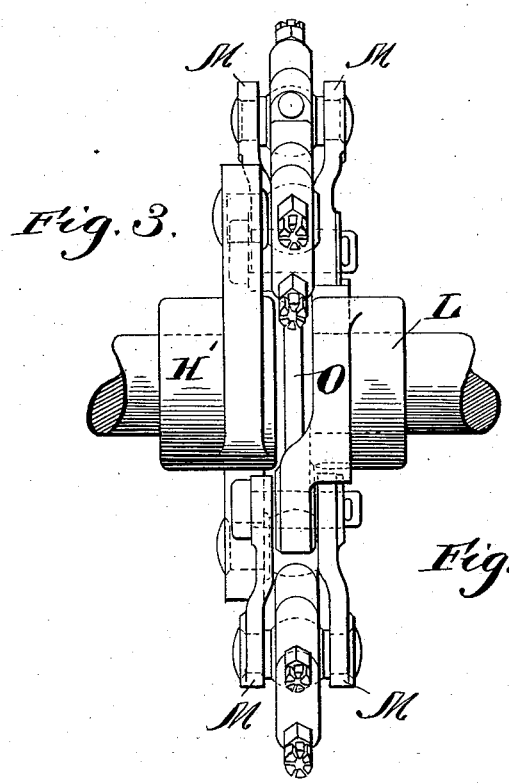
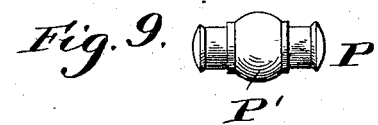
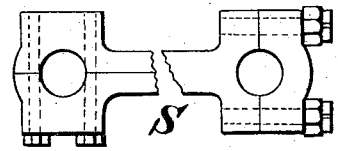
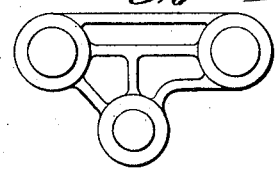
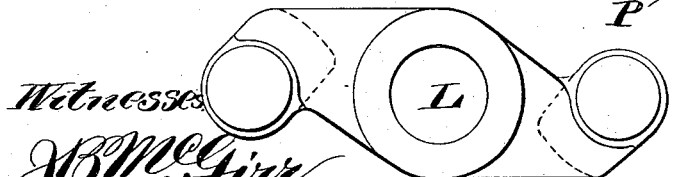

(No Model.) 3 Sheets—Sheet 3.

E. A. SPERRY.
POWER GEARING FOR TRUCKS.

No. 567,418. Patented Sept. 8, 1896.

Witnesses.
A. H. Abell.
A. F. Macdonald.

Inventor.
Elmer C. Sperry
By Geo. R. Blodgett
Atty.

UNITED STATES PATENT OFFICE.

ELMER A. SPERRY, OF CLEVELAND, OHIO, ASSIGNOR, BY MESNE ASSIGNMENTS, TO THE GENERAL ELECTRIC COMPANY, OF NEW YORK.

POWER-GEARING FOR TRUCKS.

SPECIFICATION forming part of Letters Patent No. 567,418, dated September 8, 1896.

Application filed November 11, 1893. Serial No. 490,696. (No model.)

*To all whom it may concern:*

Be it known that I, ELMER A. SPERRY, a citizen of the United States, residing at Cleveland, county of Cuyahoga, and State of Ohio, have invented a new and useful Improvement in Power-Gearing for Trucks, of which the following is a full, clear, and exact description.

My invention relates to power-transmitting devices for vehicles, more especially railway-trucks; and it consists in certain devices for transmitting power, as between the rotating axles of such trucks or between a motor or motor devices and such axles, whereby the normal flexibility of the truck is not interfered with, the construction allowing of the independent movement of the axles with reference to the truck-frame endwise and in every plane, which is well known in the art as being necessary, especially where such trucks are used in connection with short-radius curves, rough track-crossings, and the like.

It furthermore consists in certain details of construction which tend to cheapen such devices and render them more efficient.

It is fully described in the specification and pointed out in the claims, and illustrated in the accompanying drawings, in which—

Figure 11:
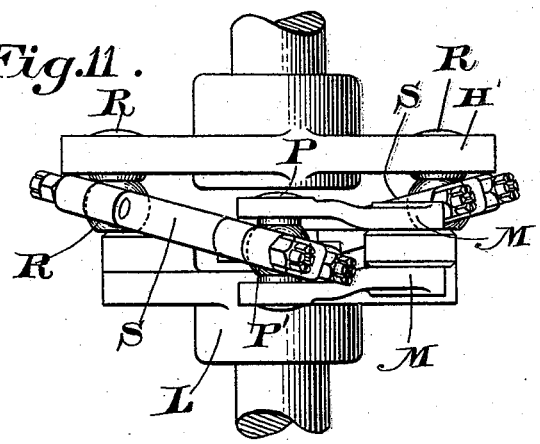
Figure 12:
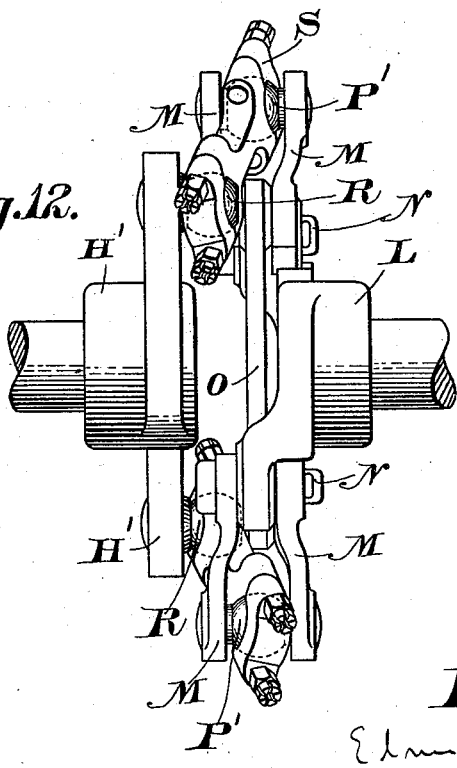

Figure 1 is a plan view of a railway-truck with the power-transmitting device in place, showing some portions of the gearing in section and the transmitting device in outline. Fig. 2 is a front elevation of the power-transmitting device. Fig. 3 is a side elevation of the same. Fig. 4 is a side view of the ball-link, partly broken away. Fig. 5 is a large section of said link and the ball-and-socket bearing on line $x\,x$, Fig. 2. Fig. 6 is an elevation of the driven member; Fig. 7, an elevation of the driver. Figs. 8, 9, and 10 illustrate details of the flexible driving device. Fig. 11 is a top plan view of the transmitting device when the shafts are separated axially. Fig. 12 is a side elevation of the same, and Fig. 13 is a detail showing the cushioning device for the bars which support the motor.

Let A A, Fig. 1, represent a truck-frame mounted upon bearings B B, &c., on the outer extremities of the axles C C, supporting flanged or other truck-wheels C' C'. Upon each of the axles is mounted a power-transmitting device, preferably a beveled gear and pinion, which are suitably housed in gear-casings (indicated at D D) geared upon axles by journal-bearings D'. The pinion-shaft of the gear is journaled in suitable bearings, also located within the gear-housing D at point $D^2$, which forms, preferably, an integral portion of such gear-housing and receives support on a cross-bar X of the truck-frame A. The pinion-shaft protrudes from its journal sufficiently for the proper securing of the hub H, carrying an arm or arms H', which constitute the driven element and are illustrated in detail in Fig. 6. A short piece of shafting, resting in suitable bearings H'', is mounted upon cross-pieces I I, secured to the truck, preferably by elastic cushions or supports I'. This shaft may or may not constitute a portion of the motor J, but it is preferably a driven shaft receiving motion from said motor. Supposing, however, that it forms a part of such motor, the motor provided with the bearings H'' is suitably supported on the cross-pieces I, which preferably are flat bars with their greatest dimension vertically disposed and relatively somewhat flexible lengthwise of the truck, as is clearly shown in dotted lines in Fig. 1, thereby allowing the motor freedom of movement in this longitudinal direction dependent upon the amount of elasticity of said bars I. It will readily be understood that such movement will take place when the vehicle strikes any obstruction, either small or great, or stands upon a grade. The inertia or momentum of the mass making up the motor J will be found to constitute a force acting to flex the bars I in the manner described. As this longitudinal movement of the driving or armature shaft takes place the extremities thereof close in upon or recede from the adjacent extremities of the pinion-shafts. In Figs. 2 and 10 will be found details of a structure constituting a flexible driving device organized to connect the extremities of the said pinion-shafts in such a manner as to provide for such longitudinal movement of said driving or armature shaft and at the same time not interfere in the least with its proper functions as a power-transmitting device. This device is substantially ical socket at each end fitting the pins P and R, substantially as described.

4. In a motor-truck, the combination with the axles, of shafts arranged lengthwise of the truck and geared to said axles, cross-bars supporting the inner ends of said shafts, other cross-bars between the shaft-supporting cross-bars, said latter bars being rigid vertically, but adapted to flex horizontally, in a direction lengthwise of the truck, a motor supported on said flexible cross-bars, and comprising a longitudinal driving-shaft, and flexible power-transmitting devices connecting each end of said shaft with an adjacent geared shaft, substantially as described.

In testimony whereof I have hereunto signed my name.

ELMER A. SPERRY.

Witnesses:
C. A. LONGFELLOW,
J. B. McGIRR.

(Model.)
A. THALHEIMER.
CLAMP FOR CIGAR MOLDS.
No. 567,419.  Patented Sept. 8, 1896.
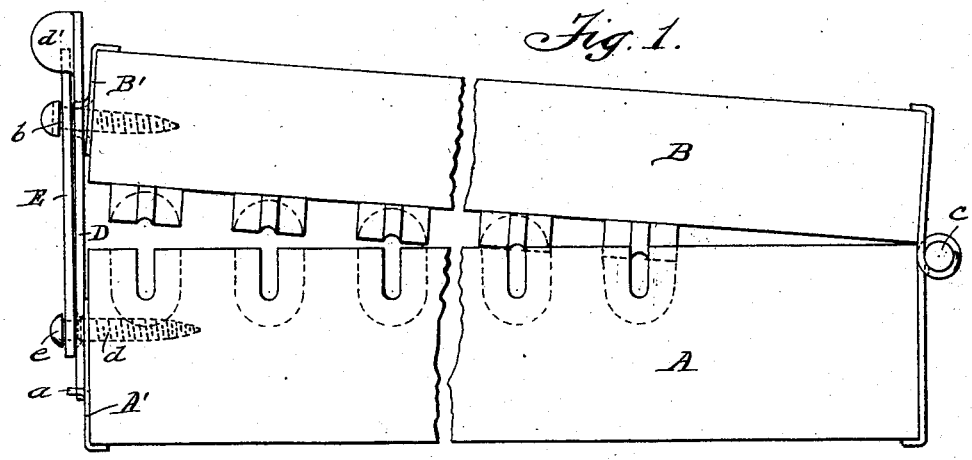
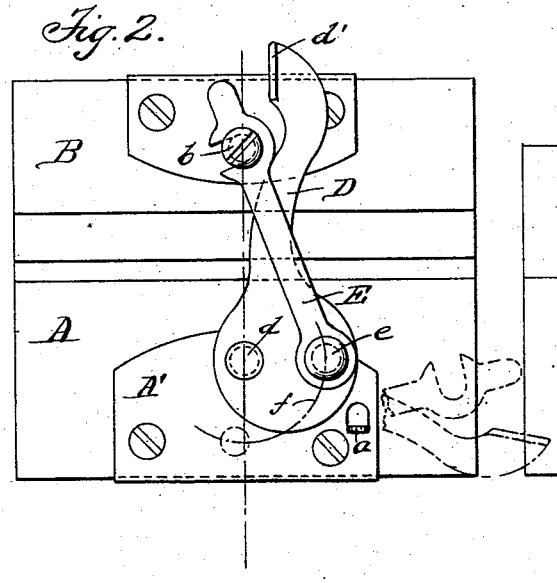
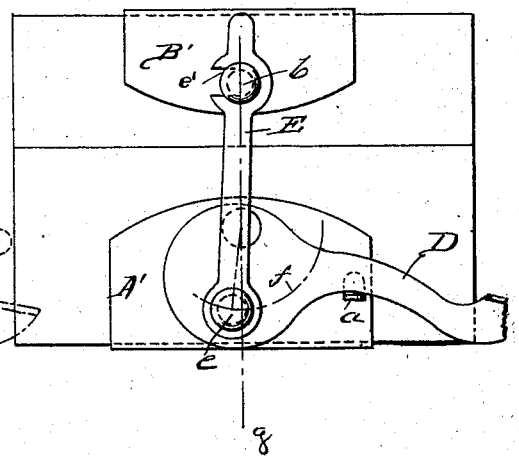
Witnesses:
David Levan
Caleb J. Bieber
Albert Thalheimer Inventor.
Attorney.